Sept. 14, 1965   F. E. ADAMSON ETAL   3,206,643
ARC-WELDING APPARATUS
Original Filed Aug. 30, 1960   4 Sheets-Sheet 4

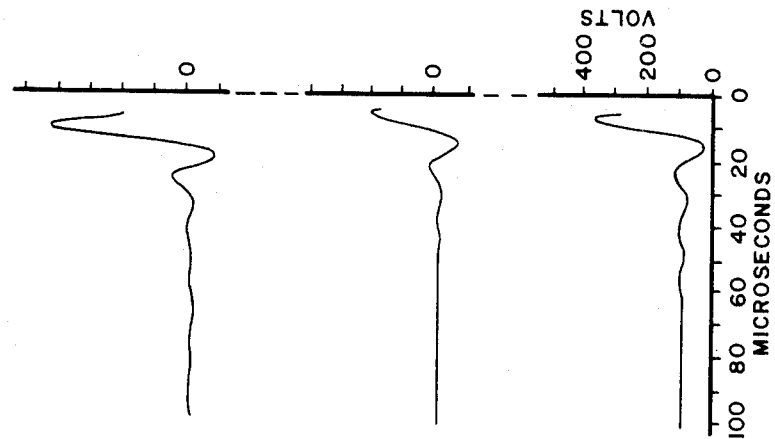
Fig. 4
Fig. 3
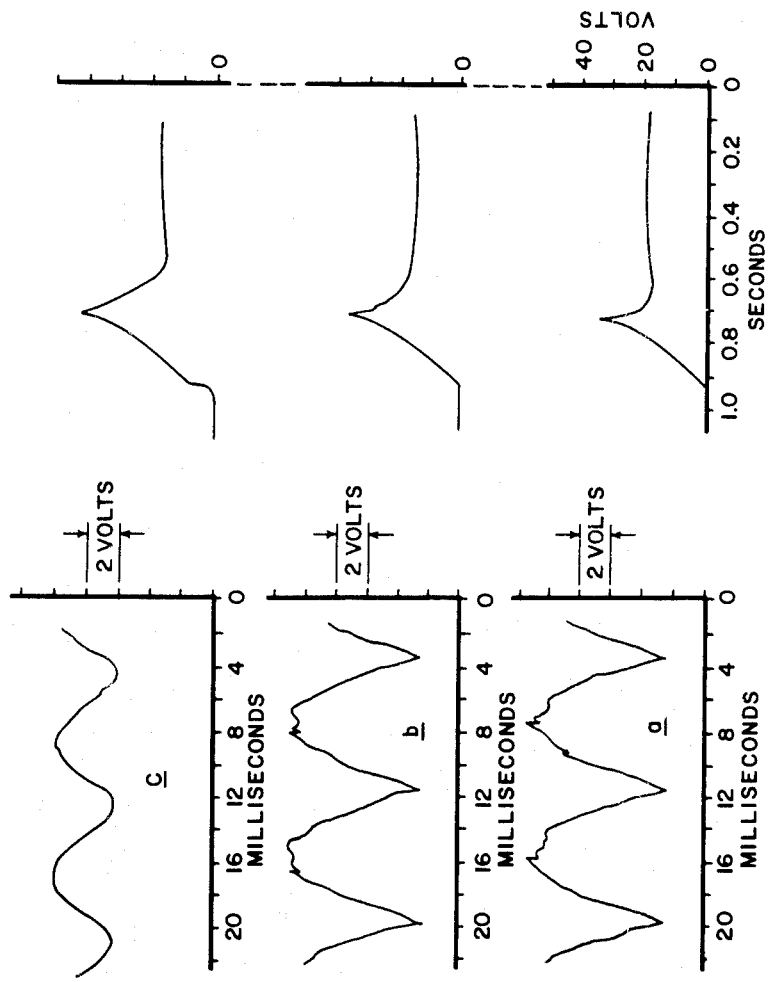
Fig. 6

जरूरत # 3,206,643
ARC-WELDING APPARATUS
Floyd E. Adamson, Kenmore, and Roger R. Giler, East Aurora, N.Y., assignors to Westinghouse Electric Corporation, East Pittsburgh, Pa., a corporation of Pennsylvania
Original application Aug. 30, 1960, Ser. No. 52,842, now Patent No. 3,082,317, dated Mar. 19, 1963. Divided and this application June 15, 1962, Ser. No. 202,716
2 Claims. (Cl. 317—18)

This application is a division of Patent 3,082,317, granted March 19, 1963 for Arc-Welding Apparatus.

This invention relates to the arc-welding art and has particular relationship to arc-welding apparatus of the consumable-electrode type in which a portable welding gun generally as disclosed in Patent 3,038,990 granted June 12, 1962, to George H. Cotter and Harry J. Bichsel for Arc-Welding Apparatus, is used. This gun includes a motor mounted in the gun for advancing an electrode from a reel mounted on the gun to the arc between the electrode and the work through a nozzle. The gun is used with a power-supply unit which supplies the power to the welding arc and with a control unit which controls the flow of welding current to the gun, the flow of shielding gas through the gun and the operation of the gun motor and other components. The power-supply unit and the control unit are in separate containers which may be separated a substantial distance from the gun. In a typical situation the gun may be used by an operator on the mast of a ship and the connections between the gun and the power-supply unit and the control unit are cables which may be 50 to 250 feet long.

The demand has arisen for such guns and controls in installations in which either direct current or alternating current may be provided. In such installations, the power-supply unit is energized independently of the control-unit and is usually of the direct-current type but could be of the alternating current type with suitable modifications of the controls. The control unit is connected to control or auxiliary supply buses which may supply either alternating current or direct current through an unpolarized connector. This connection on the control unit side of the connector must be direct and not through a transformer electrically insulating the buses from the control unit.

It is an object of this invention to provide welding apparatus including a universal control unit capable of operating either from a direct-current or an alternating-current supply and capable of being connected to this supply through an unpolarized connector.

In accordance with this invention in one of its specific aspects the control unit is supplied through a bridge rectifier. This rectifier has opposite branches in each of which one or more rectifying elements are connected and which define opposite conjugate terminals. One pair of terminals which may be called input terminals are connected to the connector which is connected to the control buses. The other conjugate terminals which may be called output or direct-current terminals are connected to the components of the control unit. When the control supply is of the alternating-current type the bridge provides direct current at its output terminals. When this supply is of the direct-current type the power to the control components is supplied through one set of arms when the connector is plugged in, in one sense and through the other set of arms when the connector is plugged in in the opposite sense.

In accordance with the specific aspects of this invention the rectifier elements in the arms are of the silicon-diode type. The expression "silicon-diode" is used here with the understanding that it may cover any low-forward-resistance, high-back-resistance, rectifying component whether it be composed of the element silicon or the element germanium or of a like element. A rectifier bridge of the silicon-diode type with high back resistance has the advantage that the back current through the relays and other components of the control unit is a minimum and these components are effectively energized and actuated. In addition, silicon-diode rectifiers themselves, are capable of operating at relatively high ambient temperatures.

In the use of the apparatus disclosed here the power supply unit for energizing the welding arc may be of the constant-current type in which the arc current is approximately constant and the voltage varies with the length of the arc. In apparatus in which the power-supply unit is of the constant-current type the motor is connected across the arc during operation. During stand-by it is desirable that the motor be connected to the control unit so that inching of the electrode may readily be carried out.

A specific aspect of this invention arises from the discovery that short-circuiting of the control supply buses must be prevented where the control unit is of the A.C.-D.C. type and it is a specific object of this invention to prevent such grounding. It has been realized that at the usual site of a welding operation one of the control supply buses may be grounded. Since the work is also grounded short-circuiting occurs, if either of the direct-current terminals of the rectifier bridge is permitted to be connected to the work while the buses are connected to what are usually regarded as the alternating current terminals of the bridge.

In accordance with this invention, switch means are provided which maintain the direct-current terminals of the rectifier bridge disconnected from the work, both during the stand-by condition of the apparatus and during the operating condition of the apparatus. Essentially this switch means controls the connections of the electrode motor during stand-by when the motor is set for inching and during operation when the motor is set to advance the electrode towards the work for arc welding. In accordance with the specific aspects of this invention the switch means includes a back contact and a front contact of the starting relay which is actuated to cause the apparatus to pass from stand-by to operation. The back contact in the unactuated condition of the relay connects the terminal of the motor to be connected to the work to one of the direct current terminals of the bridge and the front contact disconnects this terminal from the work. During operation the starting relay is actuated and the above-mentioned terminal of the motor is disconnected from the terminal of the bridge by the back contact and connected to the work by the front contact.

In early use of the apparatus disclosed herein it was found that the motor had a tendency to have a relatively short life. It is a specific object of this invention to provide apparatus of the type just disclosed in which the motor shall have a relatively long life.

This aspect of this invention arises from the discovery that the shortness of the life of the motor has several principal causes. An important factor in shortening the life of the motor is the surge which is produced during a welding operation when the operator without releasing the gun trigger, which is the starting switch, abruptly removes the electrode from the work interrupting the arc. It has been discovered that in the case of apparatus which does not embody this invention the removal of the electrode from the work and the interruption of the arc without releasing the trigger may result in an impulse of several hundred volts between the brushes across the armature of the motor. This could damage the insulation of the armature. The motor life is also shortened by the relatively high frequency voltage, or hash, which is impressed on the armature through the brushes when the motor is connected across the arc during a welding operation. The hash is produced both by the welding arc and by the commutation sparking at the brushes of the motor.

It has been found that the amplitude of the impulse produced when the electrode is removed from the work may be reduced by a factor of as much as 10 by connecting a relatively small capacitor directly between the brushes of the motor but the impulse which is now produced by withdrawal of the electrode from the work with the trigger closed has been found to have considerable hash. In accordance with this invention the hash is suppressed by a large capacitor connected across the conductors which are connected to the motor from the control unit and the power-supply unit at a point remote from the motor itself. It has been found that the life of the motor in apparatus in accordance with this invention in which a large capacitor is so connected is increased by 100%.

In the usual practice of this invention the arc is connected to the control unit by a long cable and to provide the energizing potential for the motor there are long conductors from the control unit back to the motor which is near the arc. The large capacitor is connected at the control unit between the conductors which are connected to the motor and the conductors which are connected to the arc.

In addition to its eletrcical advantages the mounting of the large capacitor at or near the control unit has the advantage of not affecting the flexibility of the gun. The capacitor usually has a capacitance of several hundred microfarads and while it may be an electrolytic capacitor it is relatively large. Such a capacitor mounted on the gun would materially impede the handling of the gun.

While the small capacitor has advantages in the preferred practice of this invention, this invention in its broader aspects may be practiced with the large capacitor connected at or near the control unit above.

A further aspect of this invention arises from the discovery that the diodes of the rectifier bridge are damaged by high surges produced during transitions in the welding operation. The cause of the surges was found to be the inductance of the contactor and gas valve solenoids in the circuit. In accordance with this invention the surges were suppressed by properly decreasing the ohmic resistance in the circuit with the solenoids.

The novel features considered characteristic of this invention are disclosed generally above. The invention itself both as to its organization and as to its method of operation togetaher with additional objects and advantages thereof will be understood from the following description of a specific embodiment taken in connection with accompanying drawings, in which:

FIGURE 3 are oscillograms of the wave form across the brushes of the electrode motor in apparatus in accordance with this invention produced during welding when the operator interrupts the arc by removing the gun from the work with the starting switch closed;

FIGURES 4 and 5 are oscillograms under like conditions produced with apparatus not incorporating certain of the features of this invention;

FIGURE 6 are oscillograms of the wave form of the ripple produced across the brushes of the electrode gun during inching under different conditions;

Figure 8:
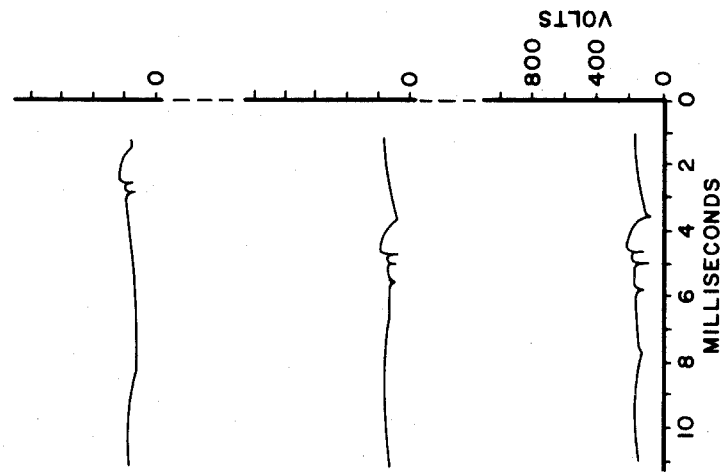
Figure 7:
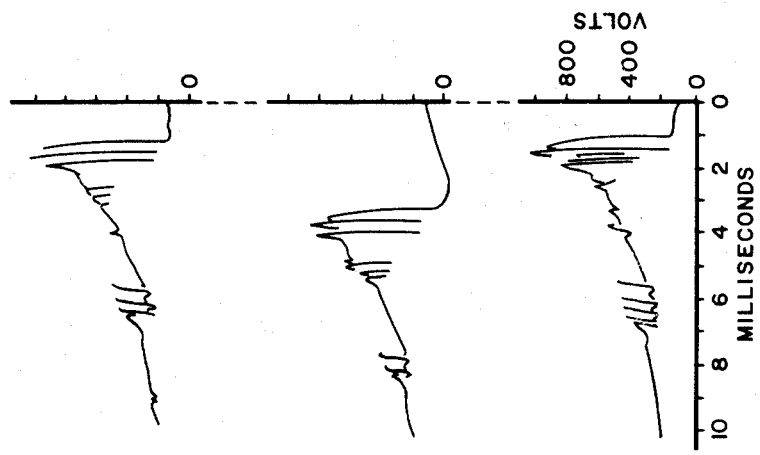

FIGURE 7 are oscillograms showing the surges produced across the diodes of the rectifier bridge in apparatus not incorporating certain of the features of this invention during the transition from the operating condition of the apparatus to the stand-by condition; and FIGURE 8 are like oscillograms produced during the transition from the operation condition to stand-by with apparatus in accordance with this invention.

The apparatus shown in the drawings includes a Gun, a Power-Supply Unit for supplying power to the arc during a welding operation and a Control Unit for controlling the operation of the Gun and the Power Supply Unit. In the preferred practice of this invention the Gun, the Power Supply Unit and the Control Unit are three physically separate units interconnected by conductors 11, 13 and 17 and cable 15 for transmitting current and a tube 19 for shielding gas. The contactor 1M which controls the Power Supply Unit is in a separate cabinet or container. Typically this contactor may be a Westinghouse MM410. The Power-Supply Unit has a grounded terminal 101 and a hot terminal 103. The terminal 101 is connected to ground conductor 17; the hot terminal 103 is adapted to be connected to conductor 11 through the contact 1Ma of contactor 1M.

Conductor 13 is connected to conductor 11 through coil 3CR of a current relay and extends from the Control Unit to the Gun. The potential from the Power Supply Unit is impressed on the electrode E through conductors 11 and 13 and contact 1Ma. The bus 15 carries a number of conductors 50, 51, 52, 53, 54 and 56 from the Control Unit to the Gun. The conductor 17 is the grounding conductor between the Power-Supply Unit and the work W. The conductor 17 is connected to the grounded terminal of the Power-Supply Unit and may be an ordinary conducting plate disposed on the deck of a ship. The tube 19 for the gas is connected from a Gas Supply through a valve controlled by solenoid SG in the Control Unit to the gas channel on the Gun. The conductors 13, the cable 15 and the gas tube 19 may be of substantial length, 50 to 250 feet, in the usual practice of this invention. The conductors 11 and 17 may be relatively long depending on the relative disposition of the Power-Supply Unit and the Control Unit.

The Power-Supply Unit may be of any suitable type, for example, a direct-current generator powered by a gas engine or a rectifier welding unit such as a Westinghouse RA welding supply. In accordance with the specific aspects of this invention the Power-Supply Unit is of the so-called constant-current variable-voltage type and in its specific aspects this invention is intimately tied in with such a Power-Supply Unit. In accordance with the broader aspects of this invention the Power Supply Unit may be of a variable-current constant-voltage type such as the Westinghouse RCP welding supply.

The Gun preferably is of the general type disclosed in Patent 3,038,990 and includes a channel 105 for transmitting an electrode E and shielding gas and a reel support carrying a relatively small electrode reel RE. The Gun also includes a motor M mounted in the handle for advancing the electrode E to the work W. The Gun has a starting switch SW and an inching switch SI which may be actuated readily by the operator.

A capacitor 1C is connected between the brushes of the motor M on the Gun. This capacitor 1C may have a capacity of about .05 microfarad and its principal purpose is to reduce surges and to prevent induced high frequency either from the arc or from neighboring equipment from being conducted through the windings of the motor M.

Figure 1:
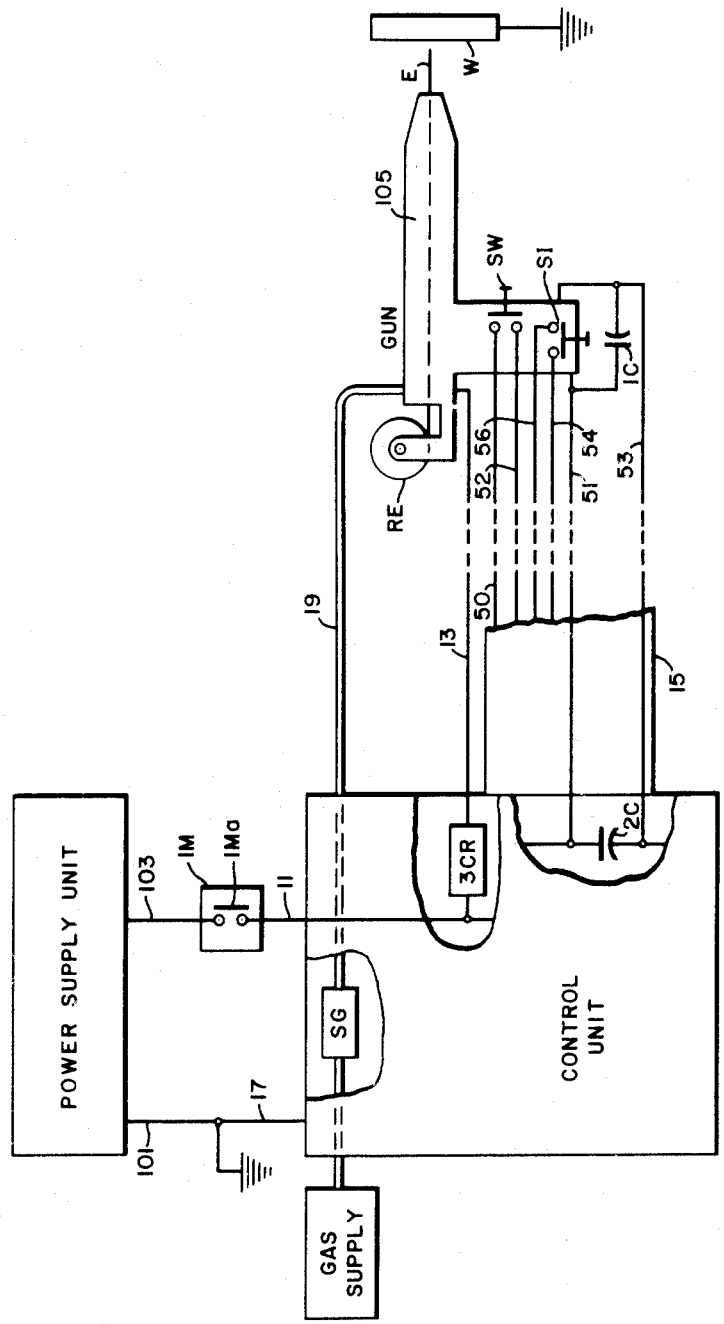
FIGURE 1 is a block diagram showing a preferred embodiment of this invention.
Figure 2:
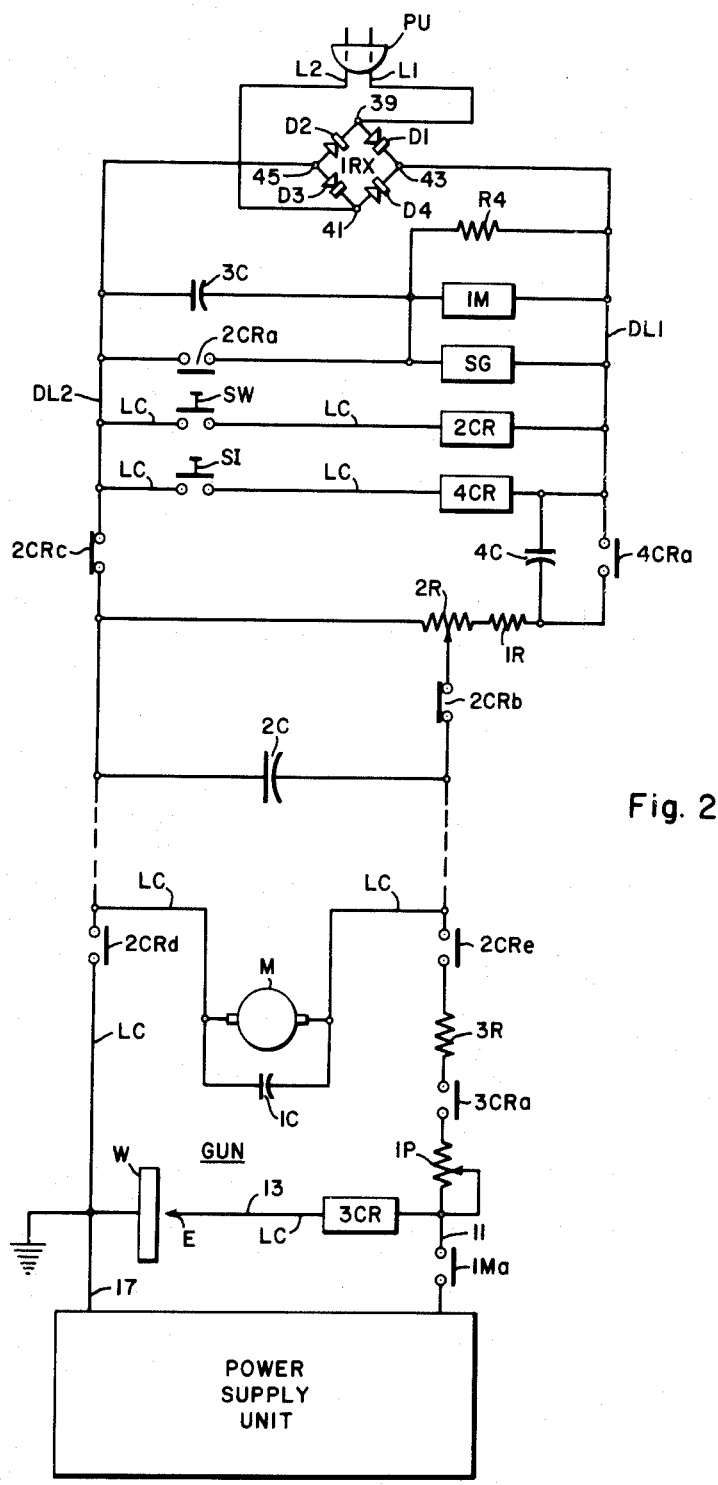
FIGURE 2 is a schematic of the embodiment of the invention shown in FIG. 1.

The contactor 1M is usually mounted on or near the Power-Supply Unit. This contactor 1M has a front contact 1Ma which energizes the conductor 11 rendering this conductor capable of supplying power for arc welding between the electrode E and the work W. A resistor R4 (FIG. 2) is connected across the coil of the contactor 1M.

The Control Unit includes a pair of supply conductors L1 and L2 which are adapted to be connected to alternating-current or direct-current buses (not shown) through an unpolarized plug PU. The Control Unit also includes a bridge rectifier 1RX having arms in each of which a silicon diode D1, D2, D3, D4 respectively is connected. One set of opposite conjugate terminals 39 and 41 of the bridge 1RX are the input terminals to the bridge and conductors L1 and L2 are respectively connected to these input terminals 39 and 41. The other opposite conjugate terminals 43 and 45 are the direct-current output terminals of the bridge and supply direct-current power to the Control Unit regardless of whether the input power is alternating current or direct current. The terminals 43 and 45 respectively, are connected to conductors DL1 and DL2 from which direct-current power is derived for the Control Unit.

The Control Unit also includes a gas solenoid for controlling the flow of gas to the Gun, relay 2CR, relay 4CR and the current relay 3CR. The relay 2CR has front contacts 2CR$a$, 2CR$d$ and 2CR$e$, and back contacts 2CR$b$ and 2CR$c$. The relay 4CR has front contacts 4CR$a$.

The solenoid of the current relay 3CR consists of about 5 turns of the conductor extending from conductor 11. The relay 3CR has a front contact 3CR$a$. Because the relay 3CR has a substantial number of turns, the ampere turns produced when welding current flows through the coil of relay 3CR are high and the relay operates to close 3CR at a relatively high speed.

The coil of contactor 1M and the solenoid of the gas valve SG are adapted to be connected between conductors DL1 and DL2 through contact 2CR$a$. This contact is shunted by a capacitor 3C which typically may have a capacity of about .05 microfarad.

The coil of relay 2CR is adapted to be connected between conductors DL1 and DL2 through the starting switch SW. The coil of relay 4CR is adapted to be connected between conductors DL1 and DL2 through the inching switch SI. The conductors DL1 and DL2 are adapted to be connected across a variable resistor 2R and a fixed resistor 1R through the front contact 4CR$a$ and the back contact 2CR$c$. The resistor 2R is set to supply the motor M with relatively low voltage for inching. One terminal of the motor M is connected to the arm of resistor 2R through back contact 2CR$b$ the other terminal of the motor is connected to conductor DL2 through back contact 2CR$c$. When back contacts 2CR$b$ and 2CR$c$ are open the motor is disconnected from DL2 and from DL1.

The terminal of the motor M which is connected to 2CR$b$ is also adapted to be connected to the junction of conductor 11 and the coil or relay 2CR through front contact 2CR$e$, a low resistor 3R, which typically may be 5 ohms, front contact 3CR$a$ and a variable resistor 1P which may have a resistance of between 25 and 50 ohms. The other terminal of the motor M is adapted to be connected to the work W through front contact 2CR$d$. The Control Unit includes a capacitor 2C which typically may have a capacitance of 300 microfarads. This capacitor 2C is connected across the terminals of the motor M at the Control Unit. For convenience in understanding the invention involved here the long conductors are labeled LC in FIG. 2.

In the stand-by condition of the apparatus the connector PU is connected to the supply conductors and conductors L1 and L2 are energized. Whether the supply buses are of the alternating-current or direct-current type conductors DL1 and DL2 are supplied with direct current. If the conductors are of the alternating-current type the rectifier 1RX rectifies the alternating potential supplied. If the buses supply direct current then the rectifier 1RX passes the direct current. The rectifier 1RX transmits the direct current regardless of the manner in which the connector PU is plugged in. If PU is plugged in so that L1 is positive and L2 is negative the direct current flows through diodes D1 and D4 and if L2 is positive and L1 negative the direct current flows through arms D2 and D4.

In the facilities in which the apparatus in accordance with this invention is customarily used one or the other of the supply buses may be grounded. Regardless of which bus is grounded the ungrounded bus is connected to DL2 during each half period when it is negative, for example, assume that the buses supply alternating current and the the conductor L1 is connected to the ungrounded bus. Under such circumstances the ungrounded bus is periodically connected to DL2 through diode D2 and L1 is electrically negative. If the buses supply direct current, the connector PU may be inserted so that the ungrounded bus is also connected to DL2 through one or the other of the diodes D2 or D3.

During stand-by buttons SW and SI are open and relays 2CR and 4CR are deenergized. Contactor 1M is also deenergized, contact 1M$a$ is then open and conductor 11 is deenergized, contact 4CR$a$ is open and the motor M is deenergized, contact 2CR$c$ is closed but the short circuiting of the power buses to ground through the work W and D2 or D3 is prevented by contact 2CR$d$ which is open.

Preparatory to a welding operation the electrode E is threaded through the gun and is properly positioned by an inching operation. For this purpose the inching button SI is closed actuating relay 4CR. Potential is then applied to the motor M through contacts 4CR$a$, 2CR$b$ and 2CR$c$. In this case the motor is connected in energizing relationship with the buses of the supply but the buses are disconnected from the work at normally open front contact 2CR$d$.

During a welding operation the push-button SW is closed. The closing of push-button SW actuates relay 2CR, opening 2CR$c$ and 2CR$b$ and closing 2CR$e$ and 2CR$d$. The conductor which was connected to 2CR$c$ is now grounded at the work W but the grounding of DL2 and the short-circuiting of the supply is prevented because 2CR$c$ is open. The actuation of 2CR also actuates 2CR$a$ energizing the gas solenoid SG and the contactor 1M. 1M$a$ is then closed energizing conductor 11 and gas is supplied through the Gun.

To start a welding operation the work W is scratched by the electrode E firing an arc, relay 3CR is then applied with current and contact 3CR$a$ is closed. Potential is then supplied to the motor M from the arc between the electrode E and the work W and the motor rotates feeding the electrode E into the arc and making the weld deposit.

Figure 5:
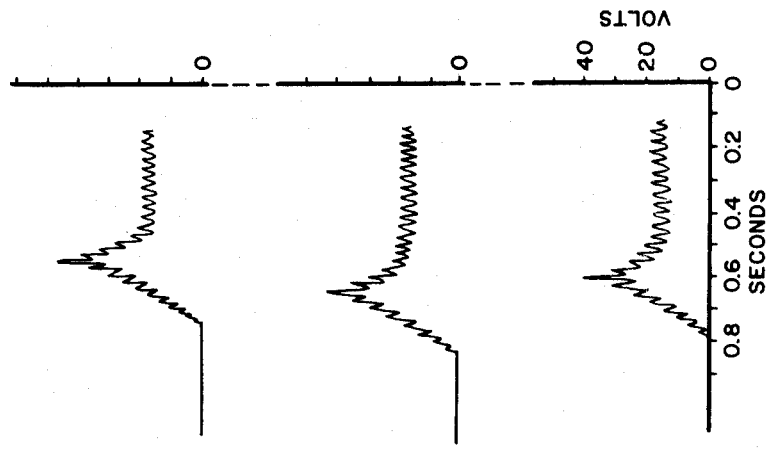

During the welding operation the operator may remove the electrode from the work interrupting the arc while still maintaining the push-button SW closed. Under such circumstances contact 1M$a$ remains closed and a surge may be impressed across the motor this would tend to seriously damage the motor. FIG. 4 shows oscillograms showing a surge of the type here discussed produced with apparatus in which neither the capacitor 1C, connected directly across the motor M, nor the capacitor 2C connected across the motor M at the Control Unit is included. As shown in the upper oscillogram of FIG. 4, the surge may be as high as 400 volts. The motor M subjected to this voltage would have a very short life. FIG. 5 shows oscillograms showing the wave form under the same conditions, that is when the operator extinguishes the arc by removing the electrode from the work with the push-button SW closed, but with the capacitor 1C connected directly across the motor M. In this case the surge is reduced to about 40 volts but as appears from the fuzziness of the oscillogram the potential impressed has a very irregular wave form including so-called hash. This wave form would tend to damage the brushes.

FIG. 3 shows oscillograms showing the potential across the motor M in apparatus in accordance with this invention when the operator extinguishes the arc by removing the electrode E from the work W with the switch SW closed. In this case a relatively low voltage appears across the motor and the hash which appears in FIG. 5 is entirely suppressed.

FIG. 6 shows the effects of the capacitors 1C and 2C on the wave form of the potential across the motor set for inching. The wave in these oscillograms corresponds to the 120 cycle ripple which is superimposed on the direct current derived through the rectifier 1RX when the supply is of the 60 cycle alternating-current type. Oscillogram *a* shows the wave form of the potential across the motor M with both capacitors 1C and 2C absent. In this case the wave form is highly irregular and would be relatively rich in harmonics. Curve *b* is an oscillogram of the voltage across the motor with only capacitor 1C connected across the motor terminals. A slight improvement is achieved by including capacitor 1C. Curve *c* is an oscillogram of the voltage across the motor M with both capacitor 1C and capacitor 2C included in the apparatus. In this case the wave form is smooth.

The oscillograms FIGS. 3 through 6 show that the capacitors 1C and 2C are essential in suppressing the various undesired disturbances which would damage the motor M. The motor is during the major portion of its operation energized from the arc potential, the arc is a highly irregular electrical phenomenon having a highly irregular wave form rich in harmonics of high frequency. The capacitors 1C and 2C suppress these higher harmonics thus preventing damage to the motor. In addition, capacitor 1C suppresses any neighboring high frequency signals which could be induced across the motor.

The charging and discharging current for capacitor 2C derived from the arc potential flows along the long conductor between the electrode E and the coil of the relay 2CR and is impressed across the capacitor 2C essentially at the end of this long conductor. The potential from the arc is impressed across motor M through additional long conductors 51 and 53 which extend from capacitor 2C to the motor. Essentially then there is substantial distributed inductance and capacitance between the arc and the capacitor 2C and additional substantial distributed inductance and capacitance between the capacitor 2c and the motor M.

The resistor R4 suppresses the surge produced by the coils of 1M and SG when the contacts 2CRa are opened. This is illustrated in FIGS. 7 and 8. FIG. 7 is an oscillogram showing the back potential across the rectifier 1RX in apparatus not including resistor R4 when the contact 2CRA is opened after an operation. The surge produced may be as high as 1000 volts. This would tend to damage or destroy diodes D1 through D4. The surge is suppressed essentially by reducing the ohmic resistance across the coil of contactor 1M and solenoid SG. The effect of the resistor R4 may be achieved by providing a low resistance contactor coil. In the usual situation this is not practicable; instead a resistance R4 is connected across the solenoids. In a typical situation where the contactor 1M is a Westinghouse MM410 the resistor R4 may be one thousand ohms.

The effect of the resistor R4 is shown in FIG. 8 which presents oscillograms of the potential across the rectifier 1RX when contact 2CRa is open produced with apparatus in accordance with this invention. In this case the potential does not rise appreciably above the supply potential.

The capacitor 3C suppresses arcing at the contacts 2CRa when they are opened.

While in accordance with the specific aspects of this invention both capacitors are essential and perform important functions, the capacitor 2C can in many situations in accordance with the broader aspects of this invention operate highly effectively to suppress most of the disturbances which could damage the motor. Apparatus including only capacitor 2C and not capacitor 1C is then within the scope of the broader aspects of this invention.

While a preferred embodiment of this invention has been disclosed herein many modifications thereof are feasible. While this invention is disclosed herein as used in arc welding, arc melting is within the scope of the broader aspects of this invention to the extent that this invention is applicable thereto. The scope of this invention in its broader aspects also extends to arc welding in which the arc is produced between a non-consumable electrode and the work and a filler is supplied by motor M. This invention then is not to be restricted except insofar as is necessitated by the spirit of the prior art.

We claim as our invention:

1. A control unit to be energized either from an alternating-current or from a direct-current source including power-supply conductors to be connected to said alternating or direct-current source as the case may be, one of said power-supply conductors being grounded when said power-supply conductors are connected to said source, power deriving conductors through which power for said unit is derived, a rectifier of the bridge type connected directly between said power-supply conductors and said power-deriving conductors so as to supply rectified direct-current power from said alternating-current source to said deriving conductors or to pass direct-current power from said direct-current sources to said deriving conductors, and means connected to said deriving conductors for maintaining all said deriving conductors disconnected from ground.

2. A control unit to be energized either from an alternating-current or from a direct-current source including power supply conductors, a non-polarized connector for connecting said conductors to said alternating-current or said direct-current soruce, as the case may be, one of said conductors being grounded through said connector when said conductors are so connected to said source, power deriving conductors through which power for said unit is derived, a rectifier of the bridge type connected directly between said power supply conductors and said power conductors so as to supply rectified direct-current power from said alternating-current source to said deriving conductors or to pass direct-current power from said direct-current source to said deriving conductors, and means connected to said deriving conductors for maintaining all said deriving conductors disconnected from ground.

References Cited by the Examiner

UNITED STATES PATENTS

| | | | |
|---|---|---|---|
| 1,953,602 | 4/34 | Hanley | 307—64 |
| 2,758,254 | 8/56 | Kramer | 317—11 |
| 2,991,397 | 7/61 | Place | 317—29 |
| 3,079,489 | 2/63 | Lobosco et al. | 219—130 |

SAMUEL BERNSTEIN, *Primary Examiner.*

LLOYD McCOLLUM, *Examiner.*